Aug. 2, 1938.  H. G. FOURCADE  2,125,553
CONSTRUCTION OF MAPS FROM PHOTOGRAPHS TAKEN FROM THE AIR
Filed April 12, 1937  2 Sheets-Sheet 1

Aug. 2, 1938.   H. G. FOURCADE   2,125,553
CONSTRUCTION OF MAPS FROM PHOTOGRAPHS TAKEN FROM THE AIR
Filed April 12, 1937   2 Sheets-Sheet 2
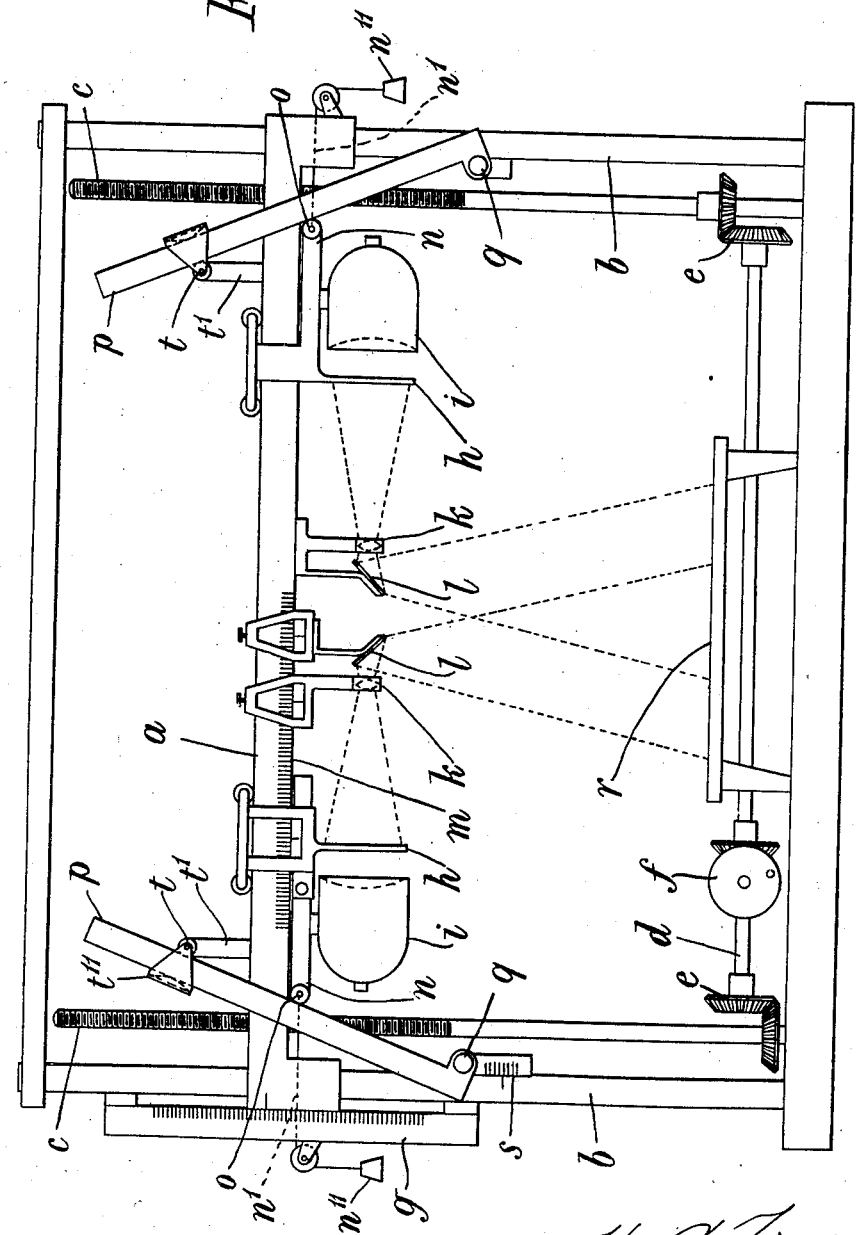

Patented Aug. 2, 1938

2,125,553

UNITED STATES PATENT OFFICE 2,125,553

CONSTRUCTION OF MAPS FROM PHOTOGRAPHS TAKEN FROM THE AIR

Henry Georges Fourcade, Humansdorp, Cape Province, South Africa

Application April 12, 1937, Serial No. 136,481
In Great Britain May 11, 1936

7 Claims. (Cl. 33—20)

This invention relates to the construction of maps from photographs taken from the air, by means of the coincidences of projected images of the photographs.

The projection of two photographs to combine stereoscopically on a screen was first effected by d'Almeida in 1858. He used green and red lights for projecting the images and red and green filters for viewing them.

The idea of utilizing the method of constructing maps from the coincidences of the images when the photographs and lenses are disposed in the same relative positions as they were in space when the photographs were taken is due to Scheimpflug.

The drawback of this method is that it can be applied strictly only when the country to be mapped lies in a plane. If the lenses and photographs are raised or lowered to bring coincidence of points above or below this plane, the convergence of the two images is altered when they are brought again into focus. If the focus is not altered, the convergence remains the same, but the images being out of focus become blurred and precision is lost. This effect is minimized by reducing the aperture of the lenses but is still considerable since sufficient light must be admitted to render the projection visible. The scale of the projected image is determined by the focal length of the lenses and can be varied only between small limits.

Various modifications of the method have been made by Gasser in Germany, Nistri in Italy, and Nelles in Canada, but in all of them the attempt is made to maintain equality of convergence of the rays in space and of the rays in the projection, with the result that every essential defect of the method remains.

The object of the present invention is to provide improved means whereby both images, which may have been taken at different heights, remain in sharp focus at all projection levels, while their geometrical relations remain mathematically accurate, and, at the same time, a wide range of scales for the constructed map is made available.

In contradistinction to the methods hitherto employed, in which the photographs are set in positions corresponding to those they occupied in space, in the present invention these positions are first determined with the apparatus itself, or else independently by known methods, and the knowledge of these positions is utilized to convert the pictures into their equivalent projections upon a horizontal plane, in a well known manner, in a rectifying camera, these rectified positives being then used in the apparatus constructed according to the present invention. But, when the tilt of the photographs in the air is too small to affect definition seriously at any one projection level, the air photographs may be used without previous rectification, because, in the present apparatus, definition is influenced by tilt only and not by change in height of the projection distance. In this case the photographs themselves or the mirrors projecting them may be tilted to produce the rectified images directly.

The invention mainly consists in the combination of a double projecting system for the construction of maps with an autofocussing system.

The invention also consists in the improved autofocussing system comprising a pivoted straight rule adapted to co-operate with a vertically movable bridge of the apparatus and a distance piece connected with a plate carriage horizontally movable on the said bridge, preferably through the intermediary of two rollers respectively associated with the said bridge and distance piece on the plate carriage.

Another feature of the invention consists in adapting the distance between a lens and its reflecting mirror in the double projecting system to be varied and the pivot of the autofocussing rule to be correspondingly vertically displaced, in order to compensate for difference in height of the air stations.

The invention also consists in the improved combined double projecting system for the construction of maps and autofocussing system, as hereinafter more particularly described with reference to the accompanying drawings, in which:

Figure 4 is an elevation of the improved apparatus, diagrammatically illustrated by way of example.

I will, first of all, refer to the principles on which the present invention is based and give a theoretical explanation of its essential features.

Figure 1:
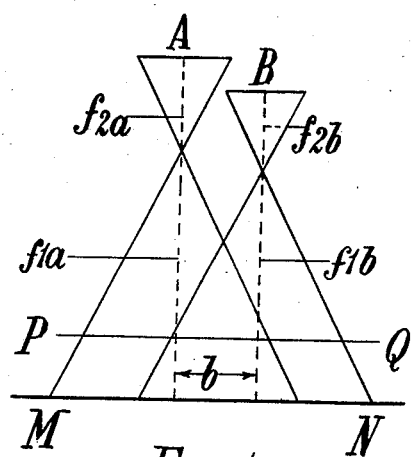
Figures 1, 2 and 3 are explanatory diagrams.

Referring to Figure 1, let A and B represent a pair of rectified copies, with a common projection distance $p$, of air photographs taken at heights $h_a$ and $h_b$ above a datum plane MN.

The projection distance is equal to the principal distance of the air photograph, multiplied by the ratio between the scale of the rectified copy and the scale of the original air photograph. The principal distance of the photograph is the length of the perpendicular between the internal perspective centre and the plane of the photograph.

For the reprojection, on a scale $s$ of the points on the datum plane we must have, B being the aerial base, $b=Bs$ $$f_{1a}/f_{2a} = \frac{sh_a}{p}; \quad f_{1b}/f_{2b} = \frac{sh_b}{p}$$

or, if F is the common focal length of the two projection lenses, $$f_{1a} = F\left(1 + \frac{f_{1a}}{f_{2a}}\right) = F\left(1 + \frac{sh_a}{p}\right)$$

$$f_{1b} = F\left(1 + \frac{sh_b}{p}\right)$$

For the projection, on the same scale, of the points on another plane PQ at a height $c$ above MN we have again $$f_{1a} = F\left(1 + \frac{s(h_a - c)}{p}\right)$$

$$f_{1b} = F\left(1 + \frac{s(h_b - c)}{p}\right)$$

and $$f_{1a} - f_{1a} = F\frac{s}{p}c$$

$$f_{1b} - f_{1b} = F\frac{s}{p}c$$

so that at successive levels $c$, $2c$, $3c$, &c., to trace the contours to scale, it is sufficient to raise the plane MN by $$F\frac{s}{p}c, \quad 2F\frac{s}{p}c$$

&c., or, conversely to lower the lens assembly equally by the same amounts, provided the plates A and B are automatically or otherwise kept in conjugate focus with the plane of the projection. By means of a hand wheel actuating, through suitable mechanism, the lens system vertically, the tracing point may be kept in apparent contact with any detail and its plan traced irrespective of variation in height.

Figure 2:
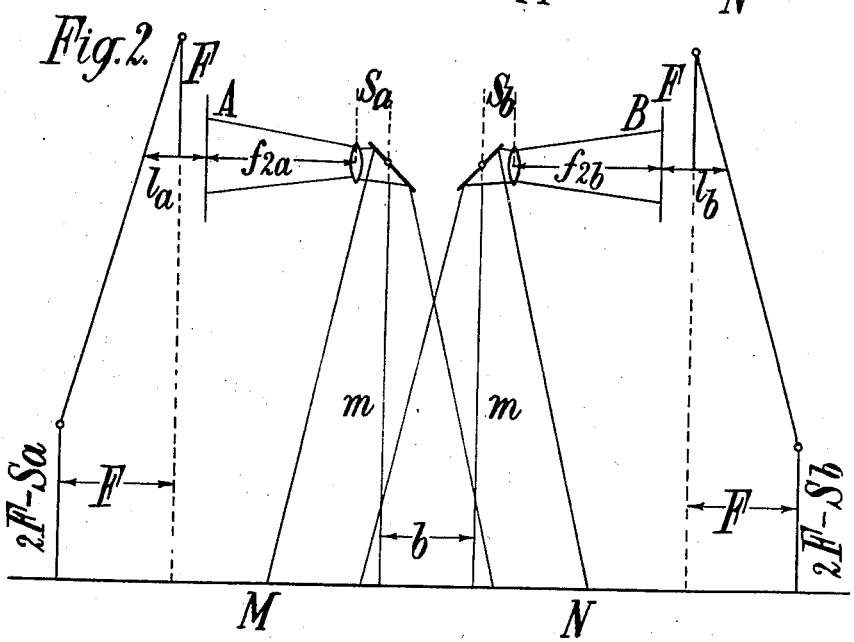

Referring to Figure 2 which is a diagram of the apparatus, the plates A and B, the projection lenses and the reflectors are carried on a horizontal bridge which may be moved vertically, by means of a pair of screws simultaneously actuated by a hand wheel, from the surface plate MN on which the projections are made, as hereinafter more particularly described with reference to Figure 4. By setting $Sa + m = f_{1a}$ and $Sb + m = f_{1b}$, the lenses mirrors, and plate centres may be kept at the same height, that is on a single slide of the bridge, the difference between $f_{1a}$ and $f_{1b}$ which is constant for one pair of plates being taken up by either $S_a$ or $S_b$. The points where the optical axes intersect the mirrors are separated by the length of the base on the scale used.

The plates are constrained to remain in conjugate focus with the surface plate by means of straight rules against which a point, in practice a roller, of each plate carriage is pressed. Each rule is centred at a point on the apparatus $2F - S_a$ or $2F - S_b$ above the level of the surface plate and is kept in contact with a fixed point, or roller, on the bridge at a height F above the level of the optical axes and likewise at a horizontal distance F from the lower centre. Each autofocussing system is at any arbitrary distance on its side of the apparatus and actuates the plate carriage by means of a distance piece $1_a$ or $1_b$ the length of which remains constant after each setting of a pair of plates.

Figure 3:
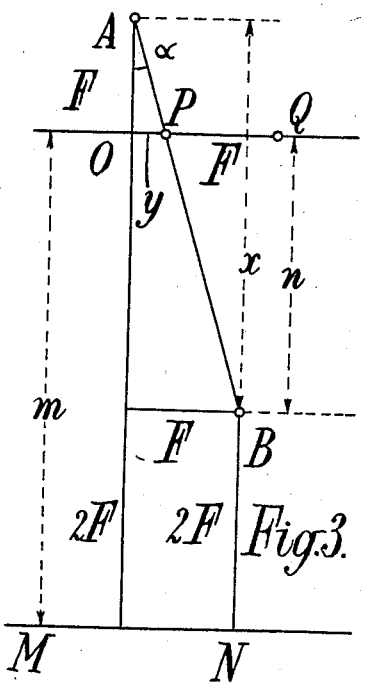

Referring to Figure 3, AB is the rule pivoted at B and touching a point P of the plate carriage and a point A fixed above the bridge.

We have:

$$y = F \tan \alpha$$
$$x = F \cot \alpha$$

$$\frac{1}{F+y} + \frac{1}{F+x} = \frac{1}{F+F\tan\alpha} + \frac{1}{F+F\cot\alpha} = \frac{1}{F}$$

If we make $F + x = f_1$ then
$$F + y = OQ = f_2$$

OQ being equal to $f_2$, and PQ a constant, the plate will remain in conjugate focus with MN if connected with P by a distance piece of constant length.

We have:

$$n = x - F = f_1 - 2F = m - 2F + S$$

The setting of B above MN must therefore be $2F - S$.

Once the apparatus has been adjusted for a pair of plates, on which are scales for calibrating the instrument, the zeros of the apparatus scales remain constant for any other pair of plates.

Referring now to Figure 4, which illustrates diagrammatically one mode of carrying the invention into effect, $a$ is a travelling bridge adapted to slide vertically on two pillars $b$, $c$ are screws in screw threaded engagement with the bridge member $a$ and connected together through the intermediary of a cross-shaft $d$ and bevel gears $e$ and adapted to be simultaneously operated by means of a hand wheel $f$ in order to cause the bridge member $a$ to be shifted up or down. This vertical displacement of the bridge member is indicated on a scale $g$.

$h$ are sliding stages carried on the bridge member $a$ and holding the photographs to be projected. $i$ are the lanterns for illuminating the photographs, $k$ the projection lenses which are of equal focus, and $l$ are the reflecting mirrors associated with the respective lenses and photographs, the centres of both photographs and both lenses being set in a straight line. The two reflecting mirrors $l$ may be separated so as to be a distance apart equal to the horizontal distance between the two air stations on the scale of the map to be drawn, which distance is indicated by a scale $m$ provided on the bridge member. One of the lenses $k$ is carried on the bridge member $a$ in such a manner that it may be displaced horizontally thereon and be set at the desired point along the scale $m$ so as to lie at a distance from its corresponding mirror $l$, equal to the difference in height of the air stations on the height scale $g$. The other lens $k$ may be fixed relatively to its corresponding mirror, or be also so arranged as to be capable of relative displacement with respect to its mirror $l$.

Referring now to the autofocussing system, the same comprises straight rules $p$ pivoted at $q$ and associated with the sliding plate stages $h$, each of which is provided with a distance piece $n$ carrying a roller $o$ which abuts against the straight rule $p$ and is kept pressed against it by means of a cord $n'$ tensioned by a counterweight $n''$. Of course, instead of such tensioned cord, use may be made of a suitable spring. The straight rule $p$ is also kept in contact with a roller $t$ carried by a bar $t'$ fixed to the bridge member $a$. $t''$ is a suitable yielding strap, by means of which the rule $p$ is kept against the roller $t$. The pivot $q$ of each autofocussing rule lies at a height above the plane of the board $r$ on which the projection is made equal to twice the focal length of the projection lenses $k$, less the distance along the optical axis, between the front nodal point of the lens and its mirror, but one of the pivots is movable vertically in a slide, and is set by means of a scale $s$ at a height differing from that of the other pivot by an amount equal to the difference in height of the air stations on the height scale $g$. The rollers $t$ lie permanently fixed at a height above the rollers $o$ equal to the focal length of the projecting lenses and at the same distance horizontally from the pivots of the rules $p$.

I wish it to be understood that the details of carrying the invention into effect may be modified in various respects without in any way departing from the spirit of the invention.

I claim:

1. An apparatus for the construction of maps from photographs taken from the air, by means of the coincidences of projected images of the photographs, comprising in combination a vertically movable bridge, two projection systems for the construction of maps, both carried by the bridge, and means for simultaneously and automatically keeping the scale of the coinciding parts of the images constant, the images in focus and the displacement of the bridge proportional to the height of the coinciding parts of the images, consisting of a plate carriage displaceable on the bridge, and a pivoted straight rule adapted to co-operate with the bridge and with the plate carriage.

2. An apparatus as claimed in claim 1 and having rollers associated with the bridge and the plate carriage, by means of which the straight rule co-operates with the bridge and the plate carriage.

3. An apparatus as claimed in claim 1, in which each projection system includes a projection lens and a mirror, and in which the pivot of the straight rule lies at the height above the plane of the board on which the projection is made equal to twice the focal length of the projection lenses, less the distance along the optical axis between the front nodal point of the lens and its mirror.

4. An apparatus as claimed in claim 1, in which each projection system includes a projection lens and a mirror, and in which the pivot of the straight rule lies at the height above the plane of the board on which the projection is made equal to twice the focal length of the projection lens, less the distance along the optical axis between the front nodal point of the lens and its mirror, and having a second straight rule pivoted at a variable distance from the plane of the board on which the projection is made, the pivot thereof being vertically displaceable, and capable of being set by means of a scale, at a height differing from that of the other pivot by an amount corresponding to the difference in height of the air stations.

5. An apparatus as claimed in claim 1 and having rollers associated with the bridge and the plate carriage, by means of which the straight rule co-operates with the bridge and the plate carriage, and in which the roller which is associated with the bridge member lies with respect to the other roller associated with the plate carriage at a height above the same, which is equal to the focal length of the projecting lenses, and at the same distance horizontally from the pivot of the rule.

6. An apparatus for the construction of maps from photographs taken from the air, by means of the coincidences of projected images of the photographs, comprising in combination a vertically movable bridge and two projection systems each comprising a plate carriage carried by the bridge and movable on it, an optical system carried by the bridge, a straight rule pivoted to a stationary part of the apparatus, and guides on the bridge and on the plate carrier for the straight rule, for obtaining the focussing movement of the plate carrier corresponding to the vertical displacement of the bridge.

7. An apparatus as claimed in claim 1, in which each projection system includes a projection lens and a mirror and in at least one projection system the lens and mirror are relatively movable.

HENRY GEORGES FOURCADE.